United States Patent
Towler et al.

(10) Patent No.: US 6,540,907 B1
(45) Date of Patent: Apr. 1, 2003

(54) FRACTIONATION FOR FULL BOILING RANGE GASOLINE DESULFURIZATION

(75) Inventors: Gavin P. Towler, Barrington, IL (US); Michael A. Schultz, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 3 days.

(21) Appl. No.: 09/900,941

(22) Filed: Jul. 9, 2001

(51) Int. Cl.⁷ .................... C10G 45/00; C10G 29/20
(52) U.S. Cl. ................ 208/211; 208/237; 208/347
(58) Field of Search ................ 208/237, 347, 208/211

(56) References Cited

U.S. PATENT DOCUMENTS

| | | | |
|---|---|---|---|
| 2,471,134 A | 5/1949 | Wright | 196/100 |
| 3,957,625 A | 5/1976 | Orkin | 208/211 |
| 4,230,533 A | 10/1980 | Giroux | 203/1 |
| 5,582,714 A | 12/1996 | Forte | 208/237 |
| 5,755,933 A | 5/1998 | Ognisty et al. | 202/158 |
| 6,228,254 B1 | 5/2001 | Jossens et al. | 208/212 |

OTHER PUBLICATIONS

Gentry, J.C. et al. *Novel Process for FCC Gasoline Desulfurization and Benzene Reduction to Meet Clean Fuels Requirements* presented at NPRA 2000 Annual Mtg., Mar. 26–28, 2000, San Antonio, TX.

Maple, R.E. et al. *Removal of Sulfur from Light FCC Gasoline Stream* presented at NPRA 2000 Annual Mtg., Mar. 26–28, 2000, San Antonio, TX.

Rudd, H. *Thermal Coupling for Energy Efficiency* Supplement to The Chemical Engineer Aug. 27, 1992, s14.

*Primary Examiner*—Walter D. Griffin
*Assistant Examiner*—James Arnold, Jr.
(74) *Attorney, Agent, or Firm*—John G. Tolomei; James C. Paschall; David J. Piasecki

(57) ABSTRACT

Savings in the processing of a naphtha boiling range feed containing a thiophene are achieved by fractionating the feed stream in a single dividing wall column to yield a $C_6$-minus overhead stream, a side-draw containing the majority of the $C_6$ and $C_7$ paraffins and olefins, and a bottoms stream comprising $C_7$ and heavier hydrocarbons. A dividing wall column provides better control of the concentration of both thiophene and toluene in the side-draw. Less of the valuable naphtha is lost and the amount of thiophene in the overhead product is minimized.

10 Claims, 1 Drawing Sheet

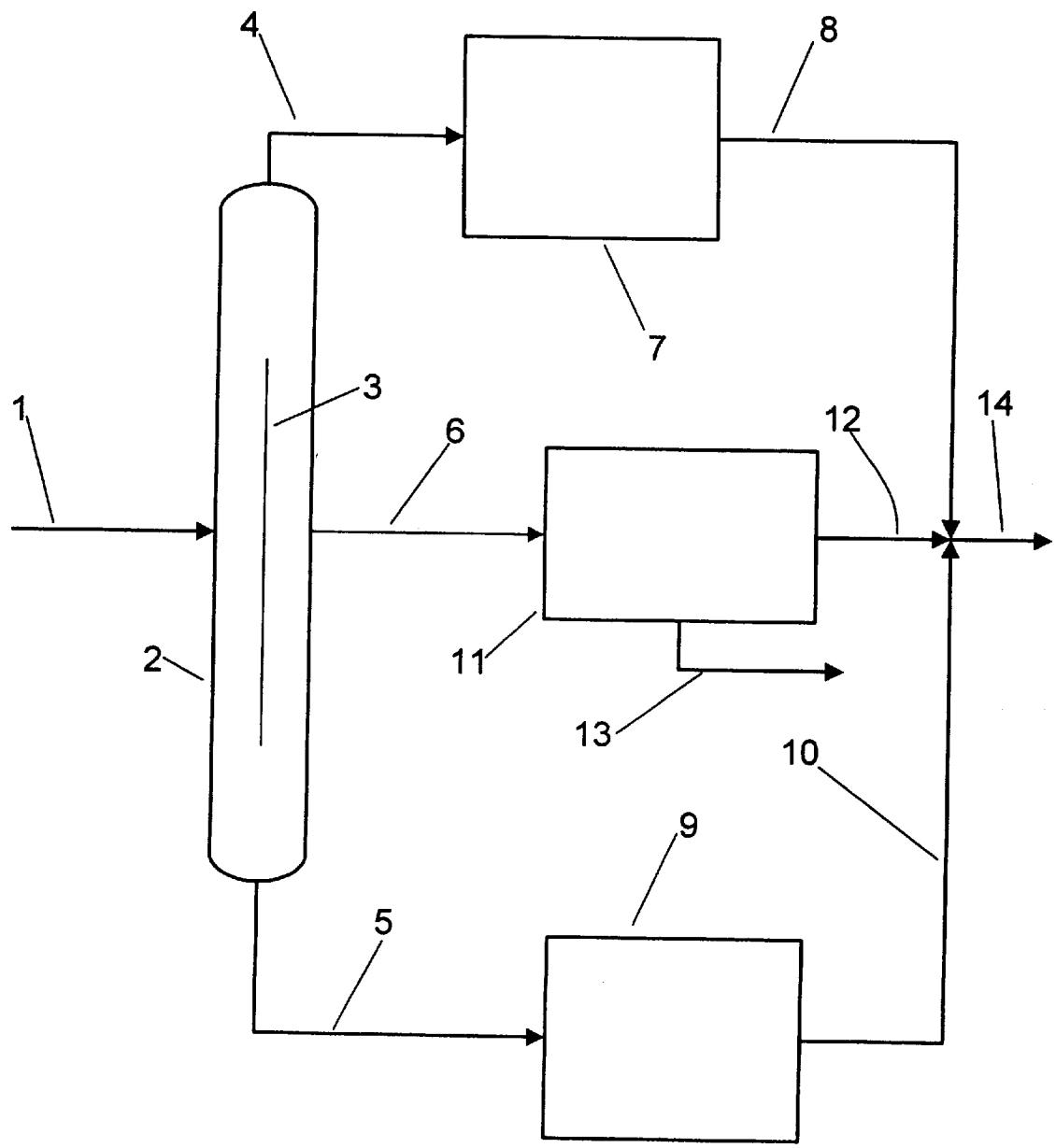

FRACTIONATION FOR FULL BOILING RANGE GASOLINE DESULFURIZATION

FIELD OF THE INVENTION

The invention is a process for the fractional distillation of naphtha or gasoline boiling range hydrocarbon fraction. This fractionation is performed upstream of processing units designed to treat an olefin-containing overhead stream and a heavier hydrocarbon bottoms stream. The invention specifically relates to the use of a dividing wall distillation column to separate a naphtha upstream of desulfurization units.

BACKGROUND OF THE INVENTION

The naphtha boiling range hydrocarbons sold commercially as gasoline are normally a blend of several streams produced in a petroleum refinery. These include reformates and alkylates which are relatively sulfur free because of upstream refining. Another major source of the naphtha boiling range hydrocarbons are processing units which do not receive a highly desulfurized feed. These include hydrocracking units, coking units and fluidized catalytic cracking (FCC) process units. The naphtha boiling hydrocarbon product streams produced by these units will contain sulfur in the form of several molecular forms including mercaptans, sulfides, disulfides, thiophenes and benzothiophenes.

Some form of sulfur removal is normally applied to these sulfur-containing hydrocarbon streams or to a blend of them to reduce the sulfur level of the final gasoline product. Increased environmental concerns are resulting in a worldwide lowering of the allowable level of sulfur in gasoline, and it has become necessary to find ways to remove increased amounts of sulfur from these hydrocarbon streams. This is especially true in the case of the full boiling range naphtha recovered from an FCC process, which often comprises a large fraction of the available gasoline pool and contains a significant amount of sulfur.

The removal of the sulfur is complicated by the various forms that it takes and by the fact that hydrotreating, one of the predominant desulfurization technologies, also hydrogenates olefins present in these streams. Paraffins tend to have lower octane numbers than the corresponding olefin and hydrogenation therefore lowers the octane number of the naphtha fraction. As described below, various methods have been developed to remove sulfur compounds from naphtha boiling range hydrocarbons. There remains however a further need for improvement in desulfurization technology which allows attaining very low sulfur levels without reducing the octane number of the fraction being treated.

RELATED ART

It has been recognized in the art that the sulfur containing compounds in a cracked gasoline fraction tend to be concentrated in the higher boiling, or heavier, portion of the gasoline. U.S. Pat. No. 3,957,625 issued to B. A Orkin discloses this and uses it to advantage by fractionating the cracked gasoline and then hydrotreating only the heavier fraction, thus avoiding hydrogenation of the lower boiling olefins. A similar approach is shown in FIG. 1 of a paper entitled *Novel Process for FCC Gasoline Desulfurization and Benzene Reduction to Meet Clean Fuels Requirements* presented at the National Petrochemical & Refiners Association 2000 annual meeting March 26–28 in San Antonio, Tex.

A paper entitled *Removal of Sulfur From Light FCC Gasoline*, also presented at the National Petrochemical & Refiners Association 2000 annual meeting March 26–28 in San Antonio, Tex. discloses that the sulfur compounds in the initial boiling point range of light FCC gasoline are predominantly mercaptans and that these mercaptans can be removed by extraction into a caustic stream. The paper also points out that as the boiling point of the gasoline increases thiophenic, sulfur starts to appear in the gasoline. As thiophenes are not extractable by the caustic it is desirable to set an endpoint to the fraction being treated by extraction which is low enough to exclude thiophenes. The thiophenes therefore remain in the heavy fraction, which is hydrotreated for desulfurization.

U.S. Pat. No. 5,582,714 -A1 issued to P. Forte describes the problem of sulfur being present in FCC gasoline and recognizes that hydrotreatment of this stream will result in loss of octane by saturation of olefinic hydrocarbons. The patent teaches the use of liquid-liquid extraction of sulfur compounds into a solvent.

U.S. Pat. No. 6,228,254 B1 also addresses the problem of sulfur in gasoline fraction but presents a two-step solution comprising hydrotreating followed by adsorption or liquid extraction with an aqueous stream. The dividing wall or Petlyuk configuration for fractionation columns was initially introduced some 50 years ago by Petlyuk et al. Dividing wall columns have been employed for the separation of hydrocarbon mixtures as evidenced by the disclosure of U.S. Pat. No. 2,471,134 issued to R. O. Wright. Recently the use of dividing wall columns has begun to expand because of the greater recognition that in certain situations dividing wall columns can provide benefits above those of conventional fractionation columns. For instance, a commercialization of a fractionation column employing this technique is described in the article appearing at page s14 of a supplement to The Chemical Engineer, Aug. 27, 1992.

U.S. Pat. No. 2,471,134 issued to R. O. Wright illustrates a dividing wall fractionation column having a partition or dividing wall 20 dividing the trayed column into two parallel vapor-liquid contacting chambers. A similar but more detailed disclosure of a dividing wall fractionation column is provided by U.S. Pat. No. 4,230,533 issued to V. A. Giroux. Dividing wall columns are closely related to a different type of column referred to as a partitioned distillation column such as illustrated in U.S. Pat. No. 5,755,933 issued to Thomas P. Ognisty et al. A partitioned distillation column differs from a dividing wall column in that the vertical dividing wall is positioned such that it contacts one end of the column. Thus only one terminal portion of the column is divided into the two parallel contacting sections. In this manner two overhead products or two bottom products may be removed from a single column. A dividing wall column produces an intermediate boiling fraction.

SUMMARY OF THE INVENTION

It has been discovered that a significant improvement can be achieved in the overall performance of a complex which first fractionates and then desulfurizes the resultant fractions of a full boiling range gasoline by employing a dividing wall column to perform the fractionation. Such a column overcomes or at least reduces problems resulting from the tendency of the thiophenes to form azeotropes with the olefinic hydrocarbons.

A first embodiment of the invention may be characterized as a process for the desulfurization of a naphtha boiling range feed stock comprising sulfur compounds, which process comprises passing the feedstock into a dividing wall column and separating the feed stock into a light fraction comprising mercaptans, olefinic hydrocarbons and paraffinic hydrocarbons having less than six carbon atoms, an intermediate fraction comprising $C_6$ and $C_7$ olefinic hydrocarbons and thiophene, and a heavy fraction which comprises sulfur compounds and hydrocarbons containing more than seven carbon atoms per molecule; passing the light fraction into an extractive first treating zone in which mercaptans are removed by contact with an aqueous alkaline solution to form a first treated stream; treating the intermediate fraction in a second treating zone, in which thiophenes are removed, to form a second treated stream; treating the heavy fraction in a third treating zone, in which sulfur containing compounds are subjected to hydrotreating, to form a third treated stream; and, recombining the first, second and third streams to form a low sulfur gasoline blending component stream.

BRIEF DESCRIPTION OF THE DRAWING

The drawing is a simplified process flow diagram showing the fractionation of a full boiling range FCC gasoline in a dividing wall column into light, heavy and intermediate boiling range fractions which can be separately treated for sulfur removal.

DETAILED DESCRIPTION AND PREFERRED EMBODIMENTS

The feed stream or streams to the subject process are sulfur-containing naphtha boiling range petroleum fractions such as FCC gasoline, coker naphtha, straight run gasoline and naphtha fractions from conversion processes such as hydrocracking or thermal cracking. These gasoline blending component streams will normally have a boiling range, as determined by the appropriate ASTM test method, falling between about 100 and 500° F. (38–260° C.), which encompasses the range of boiling points for modern gasoline. The individual feeds may include a light naphtha having a boiling point range of from that of $C_6$ to about 400° F. (204° C.), full range naphtha having a boiling point range from about that of $C_5$ hydrocarbons to about 480° F. (249° C.) and heavy naphtha boiling fraction distilling in the range of from about 260° F. to about 480° F. (126–249° C.).

These petroleum derived fractions will contain sulfur in the form of various compounds, with the relative amount of total sulfur, the types of molecule containing the sulfur and the distribution of sulfur between these molecular types being dependent upon a number of variables such as the crude oil source and the type of conversion unit(s) employed in its production. These factors are largely refinery specific and may vary depending on the season, refinery operations in general and the source of the crude oil being processed. The sulfur compounds in naphtha boiling range fractions are mainly mercaptans, aromatic heterocyclic compounds, sulfides and disulfides, but also include some thiophenes. Mercaptans in the feed stream will normally contain from 1 to 10 carbon atoms per molecule and are illustrated by methane thiol, 1-ethanethiol, 2-propanethiol, 2-butanethiol, hexanethiol, octanethiol and thiophenol. Aromatic heterocyclic compounds which may be present include alkyl-substituted thiophenes. Specific examples of these compounds include thiophene, 2-methylthiophene, 2-ethylthiophene, benzothiophene and dimethylbenzothiophene.

The total sulfur content of the combined feed to the process will exceed about 100 ppm (wt.)and will normally exceed 150 ppm (wt.). It may range up to 5000 wt ppm or more. As mentioned before, the sulfur containing compounds tend to be higher boiling and thus concentrated in the higher boiling portion of these feed stream(s). Heavier feed fractions may contain over 9000 wt ppm sulfur. The feed streams often contain olefinic hydrocarbons. This again is refinery and feed specific. A feed stream recovered from an FCC unit is likely to have an olefin content over 5 mol %, and often contains from about 10 to 40 percent olefins.

In order to meet the new gasoline sulfur content limitations refineries will need to remove a large amount of the sulfur present in the sulfur-containing naphtha boiling range fractions blended into the gasoline. As mentioned above, hydrotreating of the entire fraction will normally be undesired as it will result in the simultaneous hydrogenation of olefins to the lower octane number corresponding paraffin. An evolving strategy to deal with this problem is to fractionate the combined naphtha boiling range feedstocks into a light and a heavy fraction, and to then process these streams differently. The light fraction is rich in the olefins and contains a low percentage of the total sulfur in the combined feedstocks. Most of the sulfur in the light fraction is in the form of mercaptans, disulfides and dissolved hydrogen sulfide and can be extracted by contacting with aqueous caustic solutions with little or no loss of octane.

The heavy fraction formed by fractionation of the combined feedstocks will contain a lower amount of olefins and will contain a majority of the sulfur present in the combined feedstocks. Much of this sulfur is in the form of thiophene, benzothiophene and substituted derivatives of these two compounds. Thiophene is the lowest boiling of these compounds and therefore the most likely to be present in the lighter fraction. Thiophene is not effectively removed from the light hydrocarbon fraction by caustic extraction. The dividing point between the light and heavy fractions is therefore set to allow only as much thiophene to enter the light fraction as will allow the treated light fraction to meet the sulfur limitation as a gasoline blending component. The rest of the thiophene must be rejected into the heavy fraction, which is passed into a hydrogenative treatment as needed to affect desulfurization. At the same time it is desired to maximize the size of the light fraction to in turn maximize the amount of olefins which are retained. This defines the operational constraints of the fractionation column which performs the separation of the combined feedstock into the light and heavy fraction.

An additional cost factor which must be considered is that the saturation of olefins consumes hydrogen, which is a valuable commodity in a refinery. It is therefore also desired to avoid saturation of the olefins to minimize the operating cost of the hydrotreating step.

There are several problems intrinsic to controlling the split of the feedstock between the heavy and light fractions performed in the fractionation column while attempting to maximize the content of olefins in the light fraction. First, the amount of thiophene present in the feedstock is usually unknown at any specific time and tends to vary depending on operating conditions in upstream units such as the FCC and changes in feeds to the FCC or other units which produce the feedstock. This is further complicated by the fact that measurement of the thiophene content in FCC naphtha is difficult. In the standard analysis by gas chromatography thiophene is aliased with sec-butyl mercaptan, a compound which is easily removed by caustic scrubbing. A third complicating problem is that thiophene exhibits a strongly non-ideal vapor liquid equilibrium in mixtures of other compounds present in FCC naphtha. Azeotropes are known to form between thiophene and many compounds present in gasoline. For example, azeotropes have been reported between thiophene and n-hexane, n-heptane, and benzene.

From this it can be inferred that thiophene will also form azeotropes with homologous compounds of these species. Operational data has also indicated that thiophene will accumulate in lighter boiling fractions than would be expected based upon its normal boiling point of 84° C.

Because of these problems, a conservative approach is to design and control the fractionation column to operate with only a low recovery of the olefins overhead in the light fraction. This results in a substantial amount of $C_6$ olefins being left in the heavy fraction resulting in both octane loss and unnecessary hydrogen consumption when the olefins are hydrogenated.

It is an objective of the subject invention to improve the fractionation of the naphtha boiling range feedstock to reduce unneeded olefin saturation. It is a further objective to in general improve the fractionational distillation performed in reducing the sulfur content of this feedstock. These objectives are met in part by withdrawing an intermediate stream from a mid-point of the naphtha splitter column. This intermediate stream should contain most of the thiophene which enters the splitter column and also the co-boiling $C_6$ and $C_7$ olefins. In the subject invention the intermediate stream is formed through use of a dividing wall column. While dividing wall columns often provide reduced capital and utilities costs, the main advantage provided by the use of a dividing wall column is that the composition of the intermediate fraction can be controlled more precisely. This tighter specification on the boiling range of the intermediate stream allows a reduction in the flow rate of the intermediate stream and improved operational control. This tighter control on the composition of the intermediate stream also has advantages in the downstream treating of the intermediate stream. For instance it allows a reduction in the amount of toluene which is present in the intermediate stream. This is an advantage when the intermediate stream is treated by solvent extraction to remove the sulfur compounds. The solvent e.g. a sulfolane solution, will also extract aromatic hydrocarbons therefore removing them from the intermediate stream. This reduces the amount of recovered intermediate blending stock and increases the flow rates in the recovery sections of the is extraction zone resulting in increased operational costs. It is therefore advantageous to minimize the toluene concentration in the intermediate stream. Similarly, if an extractive separation is performed to remove the sulfur compounds, it is important to minimize the amount of methyl thiophene that is removed in the intermediate steam. The partition coefficient of methyl thiophene in sulfolane is approximately half of that of thiophene. Thus, any methyl thiophene that is removed in the intermediate stream will also result in a need for a larger capacity extraction system. A properly designed and operated dividing wall column will allow for a sharper separation between the $C_7$ normal olefin and methyl thiophene, allowing for a greater $C_7$ normal olefin recovery in the intermediate stream while still minimizing the loss of methyl thiophene in this stream. The use of a dividing column allows a sharper separation to be achieved than is possible in a side-draw column, while reducing capital cost, plot space requirements, and energy cost compared to a sequence of two distillation columns.

The process of the invention is illustrated in the Drawing, which is intended only to describe one embodiment of the invention and is not intended to limit either its application or scope. Referring now to the drawing, a combined feedstock stream is passed through process line 1 into a dividing wall column 2. The depiction of the column is simplified as all the auxiliary operational components, such as controls, trays, condenser and reboiler, may be of conventional design. Different feed streams can be fed into the column at different locations if appropriate. This column is the splitter column which produces the light, intermediate and heavy fractions of the feedstock. The dividing wall column is distinguished by the presence of a vertical dividing wall in a vertical mid portion of the column, also referred to as the dividing wall portion of the column. This dividing wall extends between opposing sides of the inner surface of the column and joins it in a substantially fluid tight seal. Thus fluids cannot pass horizontally from one side of the column to the other and must instead travel either over or under the wall. The dividing wall divides the central portion of the column into two parallel fractionation zones or chambers, which may be of different cross-section. Each chamber, and the rest of the column, will contain conventional vapor liquid contacting equipment such as trays or packing. The type of tray and design details such as tray type, tray spacing and layout may vary within the column and between the two parallel chambers of the dividing wall portion of the column.

The dividing wall column separates all of the entering naphtha boiling range hydrocarbons into an overhead stream containing all of the compounds having boiling points less than the $C_6$ olefins, an intermediate side cut stream containing $C_6$ and $C_7$ olefins and a majority of the thiophene, and a bottoms stream containing the heavier $C_7$-plus compounds. As with any fractional distillation there will be some overlap and tailing of compositions between the three cuts.

The light fraction is removed as an overhead stream comprising light hydrocarbons such as butane, pentane, any hydrogen sulfide dissolved in a feed stream, co-boiling mercaptans and some $C_6$ hydrocarbons via line 4 and passed into a treating zone 7. This zone may be of conventional design such as an extraction with an aqueous alkaline solution which will remove hydrogen sulfide and mercaptans and will produce a low sulfur light product stream of line 8.

The intermediate stream of line 6 will comprise $C_6$ and $C_7$ normal and branched olefins and thiophene. It is preferably passed via line 6 into a treating zone 11 in which it is preferably contacted with a solvent under conditions at which effect the selective removal of thiophene and other sulfur compounds present. This separation forms a sulfur containing extract stream removed via line 13 and a treated intermediate product stream carried by line 12. A solvent extraction or extractive distillation zone of this type can utilize a solvent such as sulfolane or a sulfolane derivative, dimethyl sulfoxide, or tetra ethylene glycol. It is operated at conventional extraction promoting conditions. The paper cited above entitled *Novel Process for FCC Gasoline Desulfurization and Benzene Reduction to Meet Clean Fuels Requirements* discusses this form of treating and may be consulted for further information. It however addresses the simultaneous removal of aromatics. Further information on extraction of sulfur compounds can be obtained by reference to previously cited U.S. Pat. No. 5,582,714, which is incorporated herein for its teaching on this subject. This patent discloses that sulfur can be removed from FCC gasoline by solvent extraction using polyalkylene glycol or polyalkylene glycol ether or mixtures thereof, with the resultant sulfur-containing extract stream then being subjected to hydrogenation. U.S. Pat. No. 2,634,230 describes the use of 2,4 dimethyl sulfolane to extract sulfur compounds from highly olefinic naphthas. It is also possible to treat the intermediate streams by means other than extraction. For instance, the treating zone 11 may contain catalytic treatment steps. The intermediate stream may be passed into a selective hydrogenation zone in which thiophene is hydrogenated in the presence of olefins. A different means of treating the intermediate stream is to pass it into a hydrotreating zone, which can be used to prepare the feed to a catalytic naphtha reforming unit. While this results in olefin loss, it may be a low cost processing option if the refinery already contains hydrotreating and reforming units with available capacity.

The heavy fraction produced in column 2 comprises $C_7$ and heavier hydrocarbons and coboiling sulfur containing compounds originally present in the feed stream. This stream is withdrawn via line 5 and is treated in zone 9 by conventional hydrodesulfurization or possibly a combination of conventional steps to remove the sulfur containing compounds. As the heavy fraction has a low concentration of olefins, hydrogenation does not significantly degrade the octane of this stream as it would the other two fractions. The product effluent of the treatment zone 9 is removed via line 10. It is then combined with the treated light and intermediate streams to form a treated full boiling range product stream.

The following is presented as a non-limiting illustrative example. It is a comparison of the projected performance of a regular column producing an intermediate stream by means of a side draw off the column and that of a dividing wall column. The comparison is based upon having the same number of separatory stages and same reboiler duty in both columns. There was no attempt to optimize operation or design of the dividing wall column. The comparison design specification is $1.32 \times 10^{-5}$ lb. thiophene/LB overhead product, the recovery of at least 95 percent of the $C_7$ normal olefin and less than 20 percent of the toluene in the intermediate fraction. The reflux ratio needed to meet this specification for the simple splitter case was fixed for the dividing wall column case. The feed rate is 10,000 lb./hr.

Both the simple splitter side draw column and the dividing wall column contain 30 stages of separation. The reboiler duty is 2.1 MM BTU/hr., and for each case the recovery of normal $C_7$ olefin in the intermediate stream equals 95 percent of the $C_7$ olefin in the feed. The simple side draw column produces an intermediate steam having a flow rate of 2885 lb./hr., with a toluene recovery in the intermediate stream of 0.20, (which indicates 20 wt-% of the toluene in the feed stream is "recovered" in the intermediate stream) a methyl thiophene recovery of 0.22, and a $C_5$ olefin recovery of 0.07. Compare this to a case using a dividing wall column. The intermediate stream has a flow rate of 2748 lb./hr., a toluene recovery of 0.17, a methylthiophene recovery of 0.208, and a $C_5$ olefin recovery of 0.06. This indicates that the dividing wall column has achieved a better separation than the simple sidedraw column. This is beneficial when the intermediate fraction is sent, for example, to a solvent extraction unit. For instance, for a typical set of gasoline sulfur specifications, the required solvent flow for the sidedraw case is 6687 lb./hr. vs. 6307 lb./hr. for the dividing wall column. The reduction in solvent flow for the dividing wall column case will have a beneficial impact on the cost of the solvent system. The use of a dividing wall column therefore provides important economic benefits for both the fractionation and in downstream treating steps. It allows a sharper separation to be achieved than is possible in a side-draw column, while simultaneously reducing capital cost, plot space requirements and energy cost compared to a sequence of two columns.

This improved mode of operation may be characterized as a process for the desulfurization of a naphtha boiling range feed stock comprising sulfur compounds, which process comprises passing the feedstock into a dividing wall column and separating the feed stock into a light fraction comprising mercaptans, olefinic hydrocarbons and paraffinic hydrocarbons having less than six carbon atoms, an intermediate fraction comprising $C_6$ and $C_7$ olefinic hydrocarbons and thiophene, and a heavy fraction which comprises sulfur compounds and hydrocarbons containing more than seven carbon atoms per molecule; passing the light fraction into an extractive first treating zone in which mercaptans are removed by contact with an aqueous alkaline solution to form a first treated stream; treating the intermediate fraction in a second treating zone, in which thiophenes are removed, to form a second treated stream; treating the heavy fraction in a third treating zone, in which sulfur containing compounds are subjected to hydrotreating, to form a third treated stream; and, recovering treated products.

What is claimed is:

1. In a process for the treatment of an FCC naphtha fraction to remove sulfur containing compounds wherein the FCC naphtha fraction is separated by fractional distillation yielding at least light and heavy fractions, the improvement which comprises performing the fractional distillation in a dividing wall column and producing an intermediate fraction comprising $C_7$ olefins and thiophene.

2. A process for the desulfurization of a naphtha boiling range feed stock comprising sulfur compounds, which process comprises:

a.) passing the feedstock into a dividing wall column and separating the feed stock into a light fraction comprising mercaptans, olefinic hydrocarbons and paraffinic hydrocarbons having less than six carbon atoms, an intermediate fraction comprising $C_6$ and $C_7$ olefinic hydrocarbons and thiophene, and a heavy fraction which comprises sulfur compounds and hydrocarbons containing more than seven carbon atoms per molecule;

b.) passing the light fraction into an extractive first treating zone in which mercaptans are removed by contact with an aqueous alkaline solution to form a first treated stream;

c.) treating the intermediate fraction in a second treating zone, in which thiophenes are removed, to form a second treated stream;

d.) treating the heavy fraction in a third treating zone, in which sulfur containing compounds are subjected to hydrotreating, to form a third treated stream; and e.) recovering treated products.

3. The process of claim 2 further characterized in that the recovery of thiophene in the light fraction is controlled to be less than 50 wt. ppm.

4. The process of claim 2 further characterized in that the recovery of $C_7$ olefinic hydrocarbons in the intermediate stream is greater than 30% of the $C_7$ olefin content of the feed stream.

5. The process of claim 2 further characterized in that the second treating zone comprises a solvent extraction zone in which thiophene is removed from the intermediate fraction.

6. The process of claim 5 in which the solvent comprises sulfolane or a sulfolane derivative.

7. The process of claim 5 in which the solvent comprises di methyl sulfoxide.

8. The process of claim 5 in which the solvent comprises tetra ethylene glycol.

9. The process of claim 2 further characterized in that the second treating zone comprises a selective hydrogenation zone in which thiophene is hydrogenated in the presence of olefins.

10. The process of claim 2 further characterized in that the treating of the intermediate fraction comprises hydrotreating followed by passage into a catalytic naphtha reforming zone.

* * * * *